Nov. 13, 1934.   J. T. EUBANK   1,980,792
MACHINE FOR AUTOMATICALLY SEALING HOODS ON BOTTLES
Filed Aug. 20, 1931   11 Sheets-Sheet 1

Inventor
John T. Eubank
By Mason Fenwick & Lawrence
Attorneys

Nov. 13, 1934.  J. T. EUBANK  1,980,792
MACHINE FOR AUTOMATICALLY SEALING HOODS ON BOTTLES
Filed Aug. 20, 1931  11 Sheets-Sheet 2
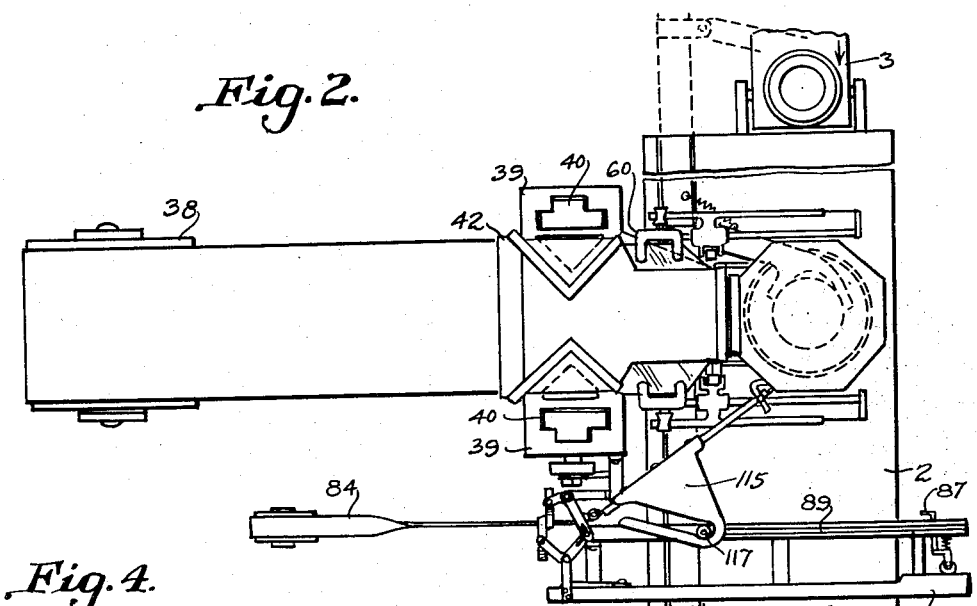
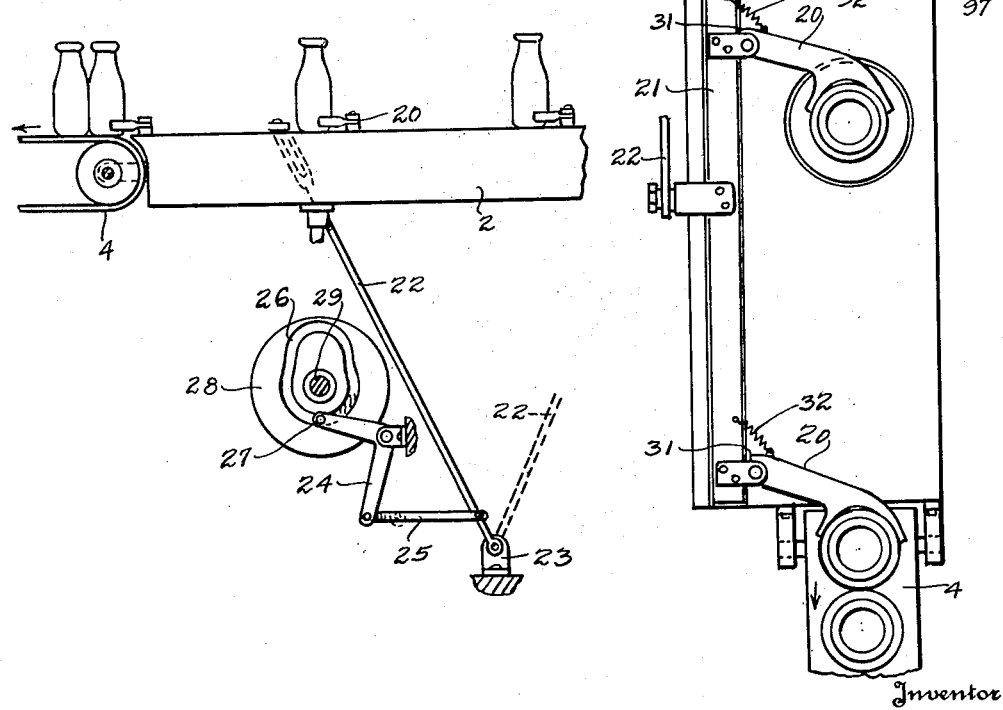
Inventor
John T. Eubank
By Mason Fenwick Lawrence
Attorneys

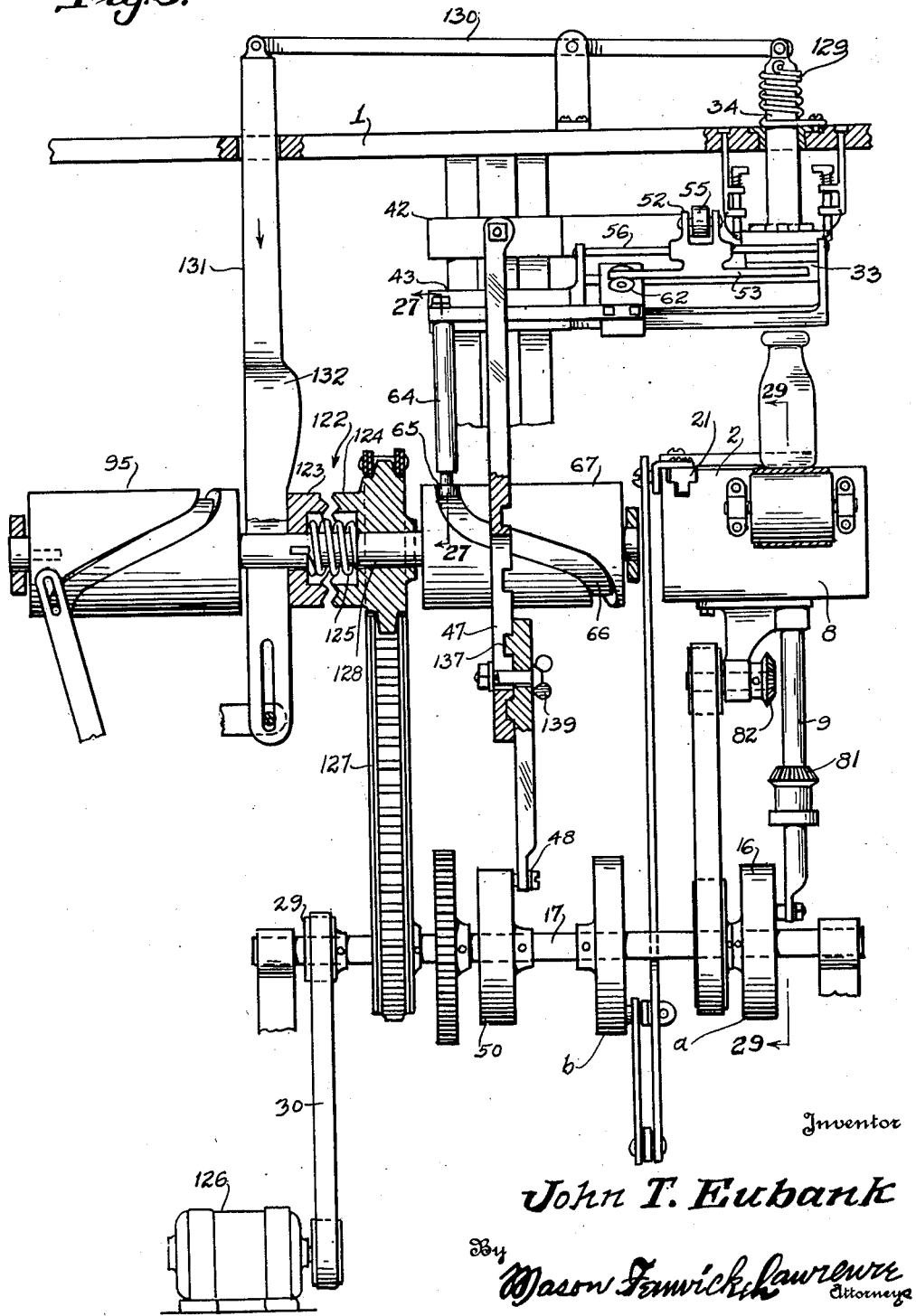

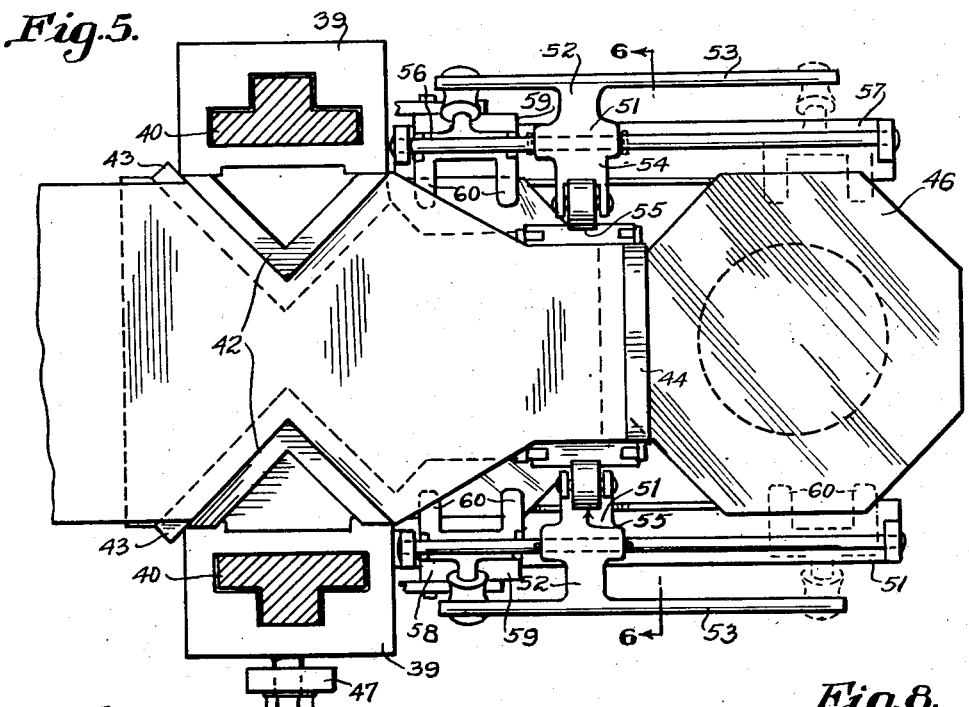
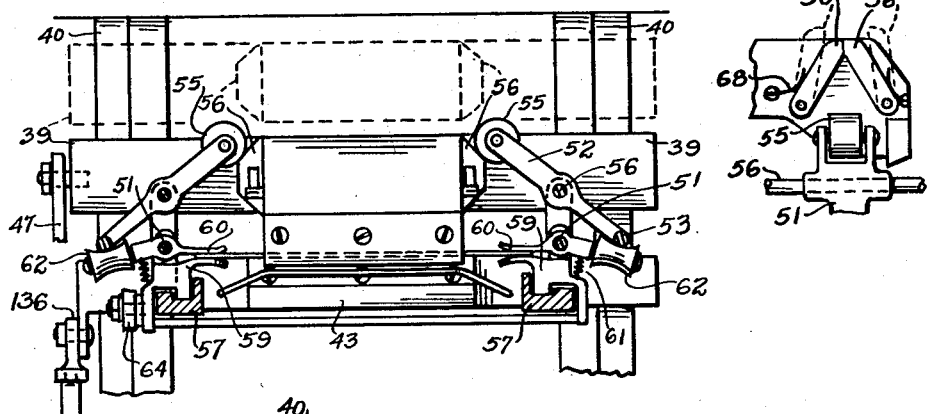
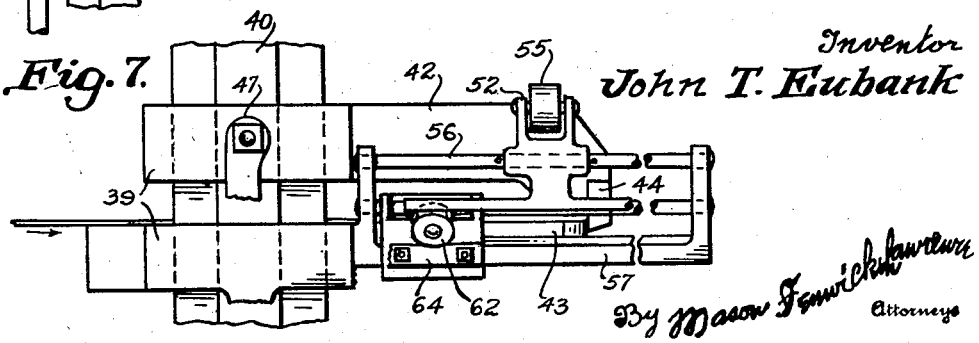

Nov. 13, 1934. J. T. EUBANK 1,980,792
MACHINE FOR AUTOMATICALLY SEALING HOODS ON BOTTLES
Filed Aug. 20, 1931 11 Sheets-Sheet 5
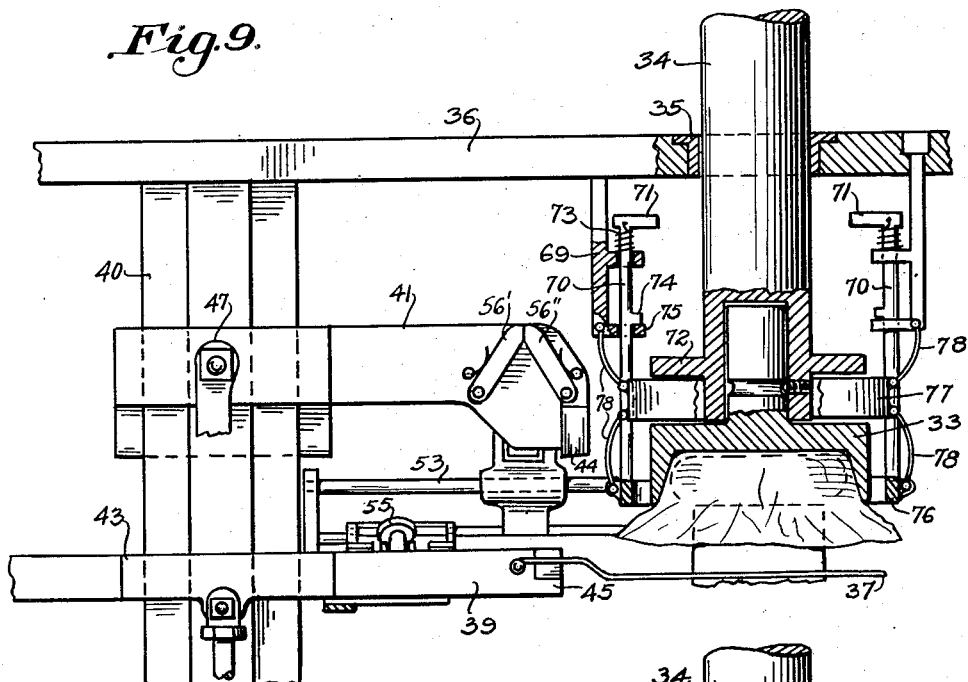
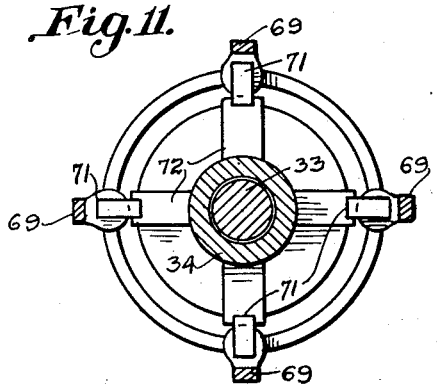
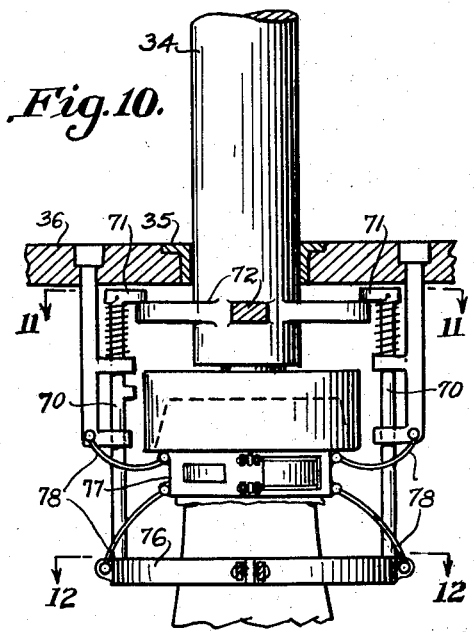
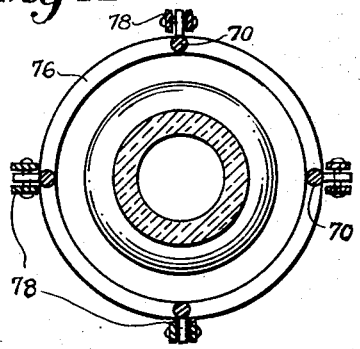
Inventor
John T. Eubank
By Mason Fenwick Lawrence
Attorneys Nov. 13, 1934. J. T. EUBANK 1,980,792
MACHINE FOR AUTOMATICALLY SEALING HOODS ON BOTTLES
Filed Aug. 20, 1931 11 Sheets-Sheet 6
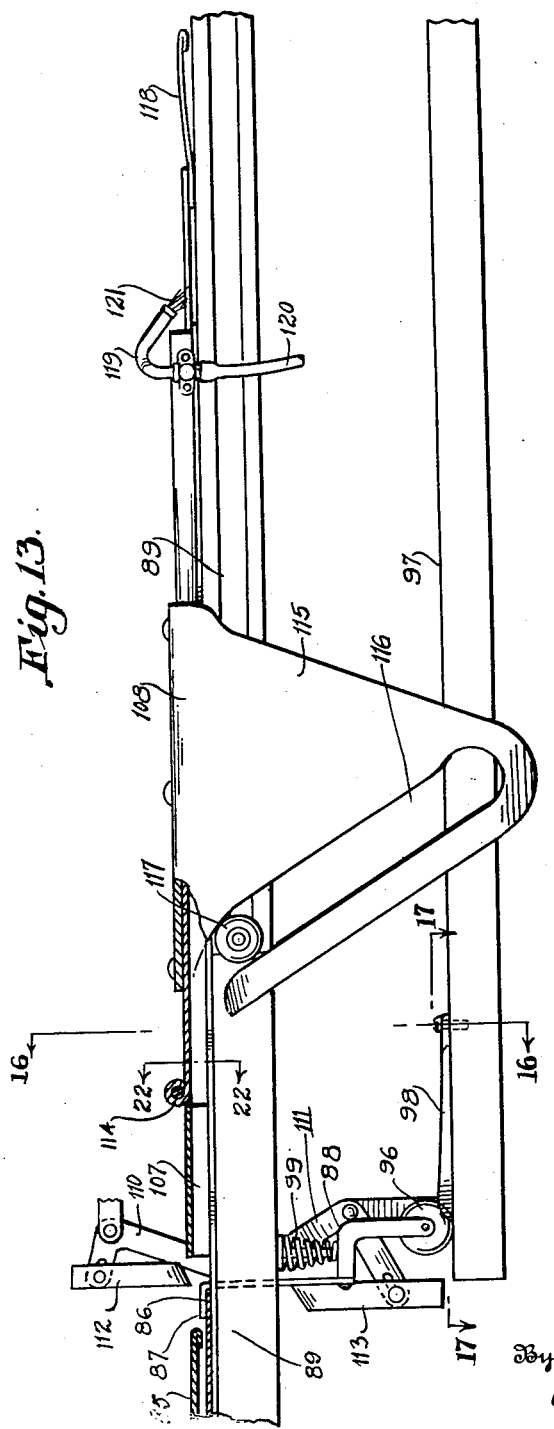
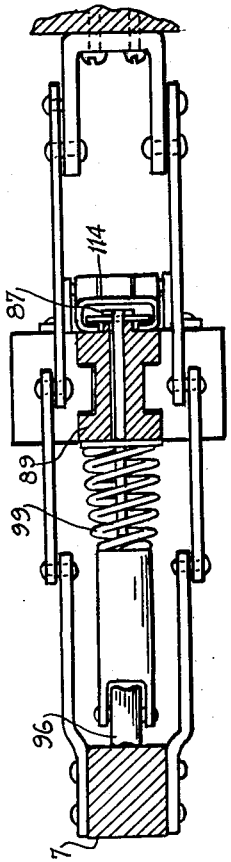
Inventor
John T. Eubank Nov. 13, 1934.  J. T. EUBANK  1,980,792
MACHINE FOR AUTOMATICALLY SEALING HOODS ON BOTTLES
Filed Aug. 20, 1931   11 Sheets-Sheet 7
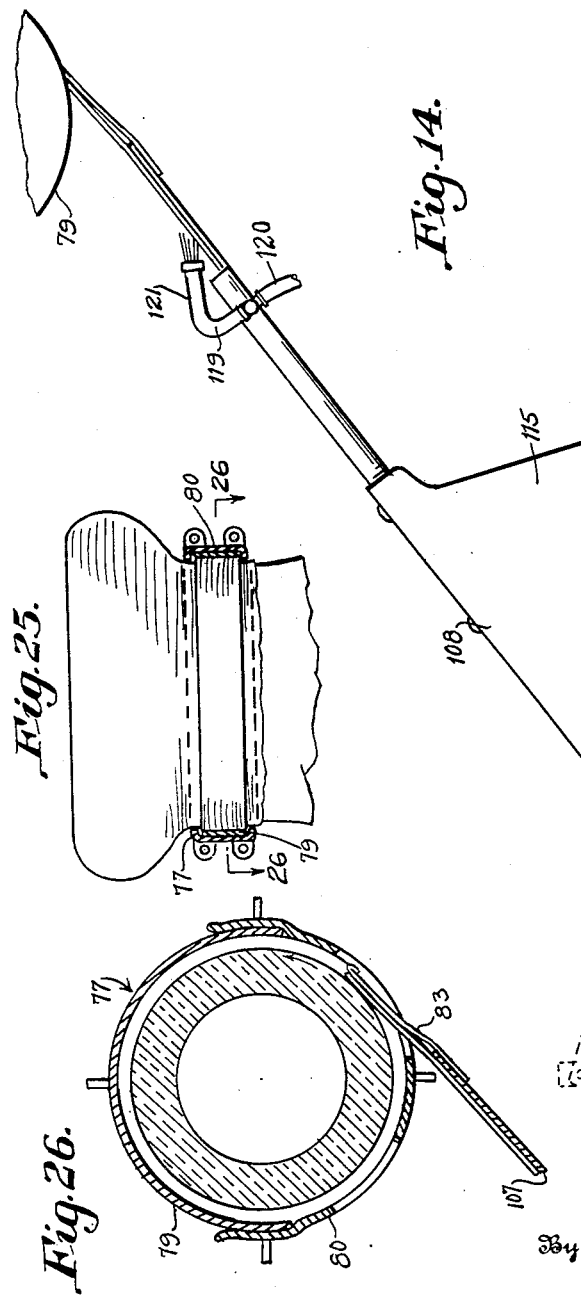
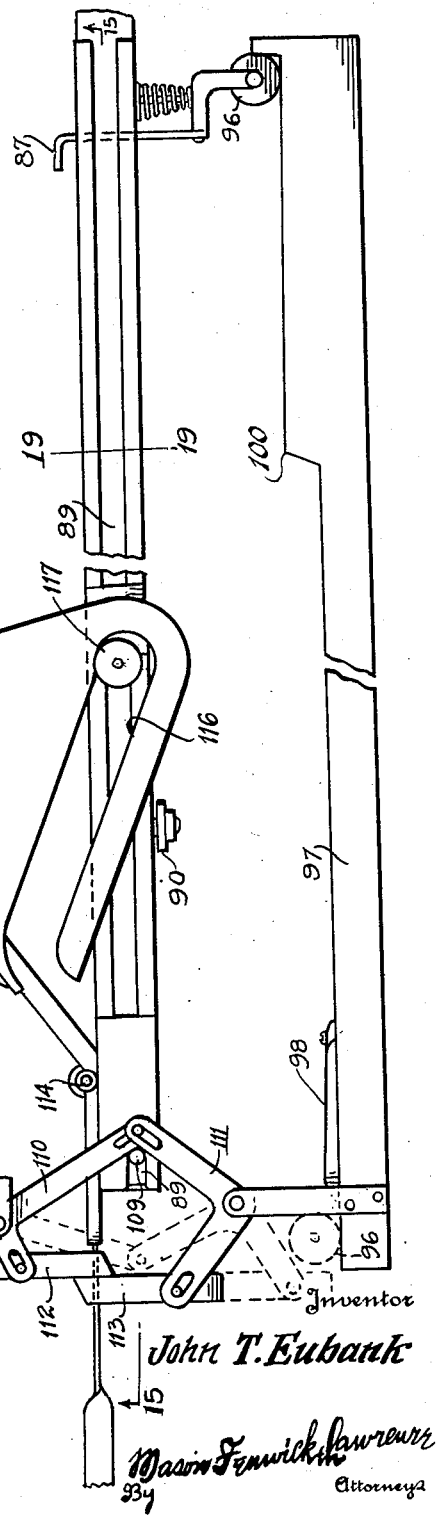
Inventor
John T. Eubank
By Mason Fenwick Lawrence
Attorneys

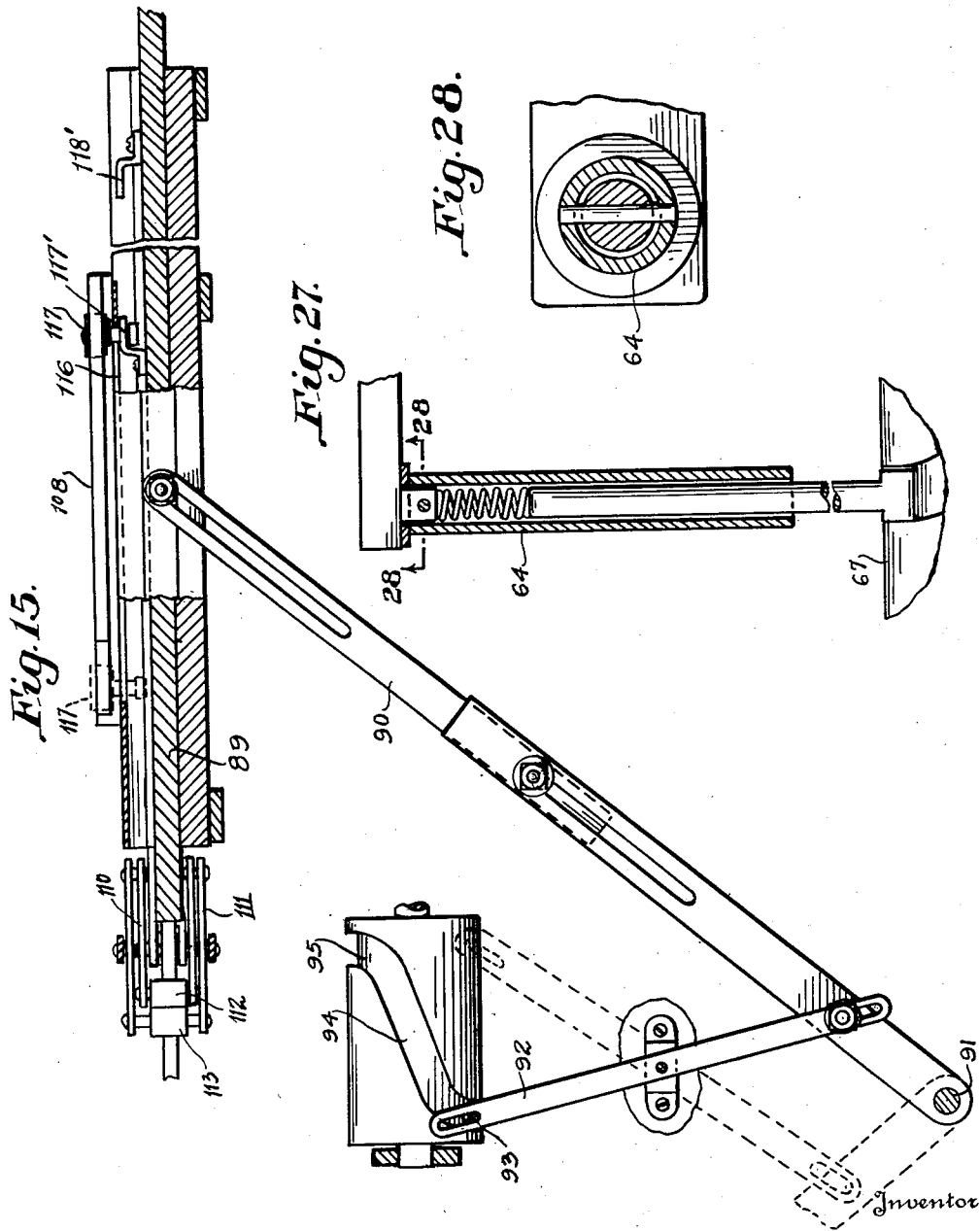

Nov. 13, 1934.  J. T. EUBANK  1,980,792
MACHINE FOR AUTOMATICALLY SEALING HOODS ON BOTTLES
Filed Aug. 20, 1931  11 Sheets-Sheet 9
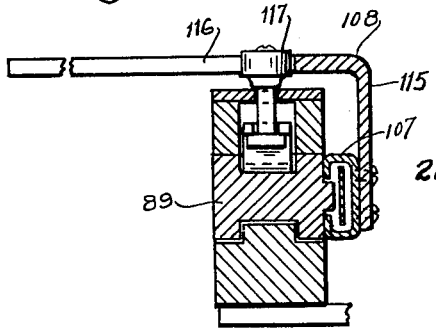
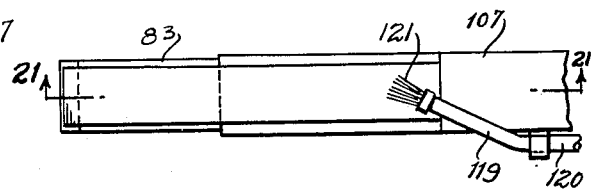
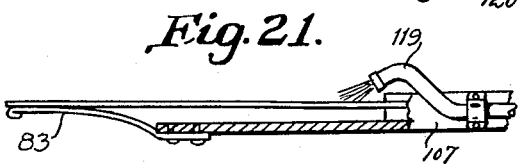
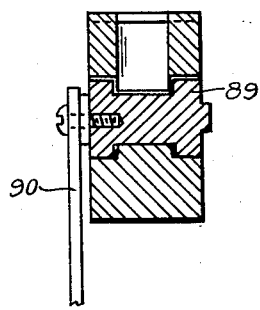
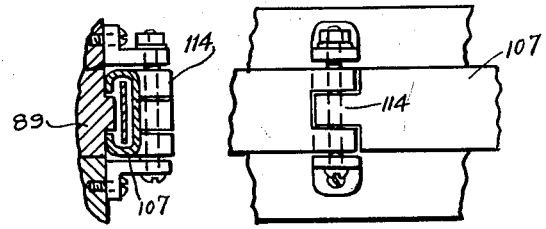
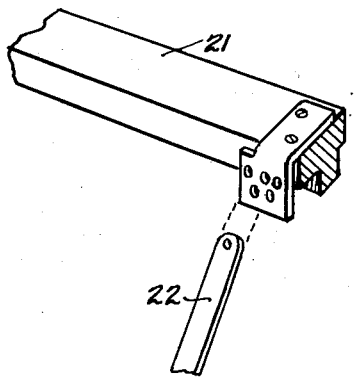
Inventor
John T. Eubank
By Mason Fenwick & Lawrence
Attorneys

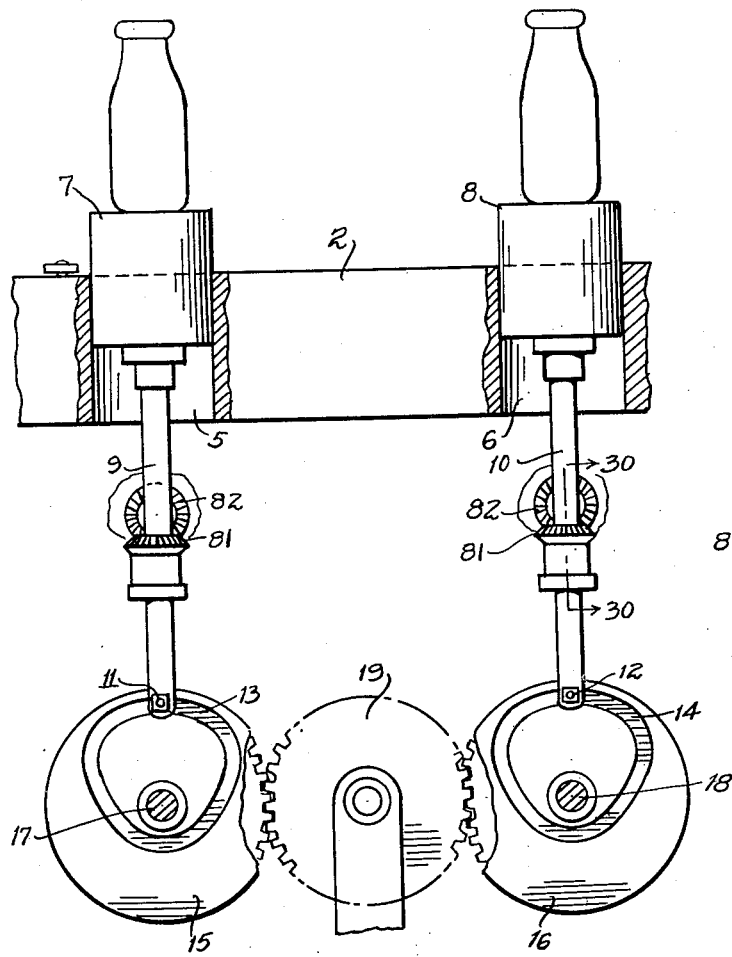
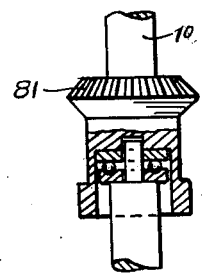

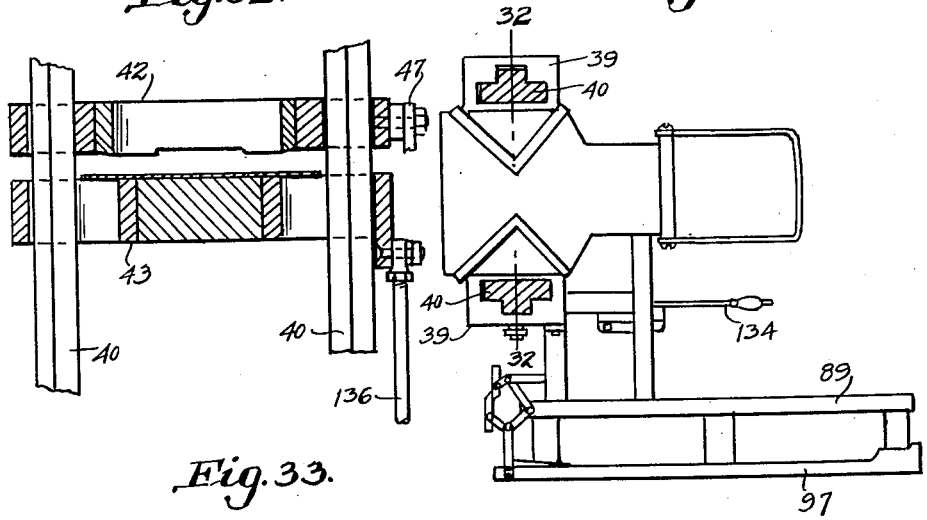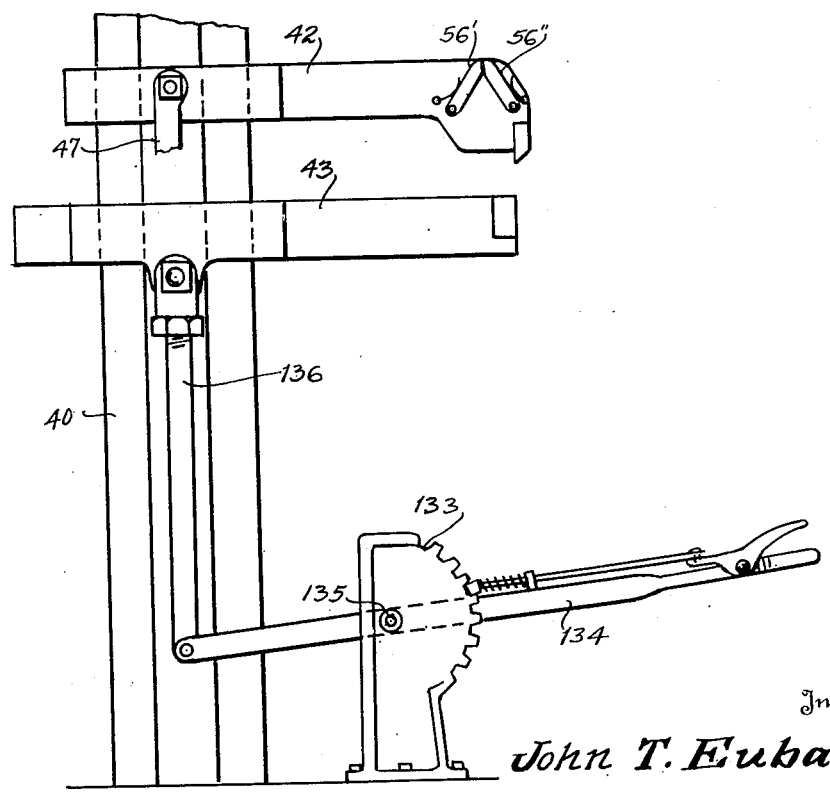

Patented Nov. 13, 1934

1,980,792

UNITED STATES PATENT OFFICE 1,980,792

MACHINE FOR AUTOMATICALLY SEALING HOODS ON BOTTLES

John T. Eubank, Sherman, Tex., assignor, by mesne assignments, to Package Machinery Company, Springfield, Mass., a corporation of Massachusetts Application August 20, 1931, Serial No. 558,394

9 Claims. (Cl. 226—83)

This invention relates to automatic machines for applying sanitary hood seals to the mouths and pouring lips of milk bottles.

While the scope and nature of the invention adapts it to general usage in the bottling of beverages and other liquids where it may be desired to enclose the mouth of the bottle by a hood, it is especially designed for encompassing the mouths and pouring lips of capped milk bottles, using a section of paper cut in circles or other shapes, and especially with a transparent sheet of impervious material such as Cellophane, through which sheet or membrane the cap with such advertising as it may carry is visible.

One of the objects of the invention is to bring the capped bottles successively to a sealing place and to bring to that place from continuous sources, the sealing membrane and tape for securing the sealing membrane, both said membrane and tape in suitably sized pieces being severed from their respective sources at the place of their application.

Another object of the invention is to provide means whereby the bottle itself functions as an instrumentality in the forming of the sealing hood by rising above the plane of the sealing sheet forcing the latter into a conforming mold or recess into which the mouth of the bottle telescopes.

Still another object of the invention is the provision of means responsive to the failure of a bottle to appear at the proper time at the sealing point, for inhibiting the actuation of the Cellophane and tape feeding means, while still permitting the uninterrupted operation of the bottle feeding means.

Other objects of the invention relate to the construction of features forming elements in the general combination, such for instance, as the specific Cellophane and tape feeding and applying mechanism, the means by which the sealing hood is conformed to the bottle, the cutting means, bottle feeding means, and the inhibiting means for stopping waste of Cellophane and tape when no bottle is at the place of feeding.

Other objects of the invention will appear as the following description of an illustrative embodiment of the apparatus proceeds.

In the drawings in the several figures of which the same characters of reference have been used throughout to denote identical parts, Figure 1 is a perspective assembly view, parts being omitted;

Figure 2 is a plan view of a two-unit machine, parts being omitted;

Figure 3 is an end elevation of the tape and Cellophane feeding and applying units and their appurtenant parts;

Figure 4 is a front elevation of the bottle feeding means;

Figure 5 is a fragmentary plan view of the Cellophane supplying and cutting means;

Figure 6 is a vertical section taken along the line 6—6 of Figure 5;

Figure 7 is a side elevation of the parts shown in Figure 5;

Figure 8 is a detail of the gripper control for the transparent sheet;

Figure 9 is a side elevation, parts being shown in section of the cutting dies for the transparent sheet, the forming head and their associated parts;

Figure 10 is a fragmentary partly sectional view showing the bottle in the forming head in its uppermost position;

Figure 11 is a section taken along the line 11—11 of Figure 10;

Figure 12 is a section taken along the line 12—12 of Figure 10;

Figure 13 is a plan view partly in section of the tape control means in normal position;

Figure 14 shows the parts illustrated in Figure 13 in tape applying position;

Figure 15 is a section taken along the line 15—15 of Figure 14 with the control cam also shown;

Figure 16 is a section along the line 16—16 of Figure 13;

Figure 17 is a section taken along the line 17—17 of Figure 13;

Figure 18 is a section taken along the line 18—18 of Figure 13;

Figure 19 is a section taken along the line 19—19 of Figure 14;

Figure 20 is a fragmentary elevation of the free end of the tape feeder;

Figure 21 is a section taken along the line 21—21 of Figure 20;

Figure 22 is a section taken along the line 22—22 of Figure 14;

Figure 23 is a fragmentary side elevation of the parts shown in Figure 22;

Figure 24 is a fragmentary detail of the T-bar associated with the bottle feeding means;

Figure 25 is a fragmentary elevation of the top of a bottle with the tape band in position;

Figure 26 is a section taken along the line 26—26 of Figure 25;

Figure 27 is a vertical section taken along the line 27—27 of Figure 3;

Figure 28 is a section taken along the line 28—28 of Figure 27;

Figure 29 is a section taken along the line 29—29 of Figure 3, but with the parts in elevated position;

Figure 30 is a section taken along the line 30—30 of Figure 29;

Figure 31 is a detail plan of the Cellophane and tape feeding and applying units;

Figure 32 is a section taken along the line 32—32 of Figure 31; and

Figure 33 is a side elevation of the adjusting means for the Cellophane and taping units.

Figure 1:
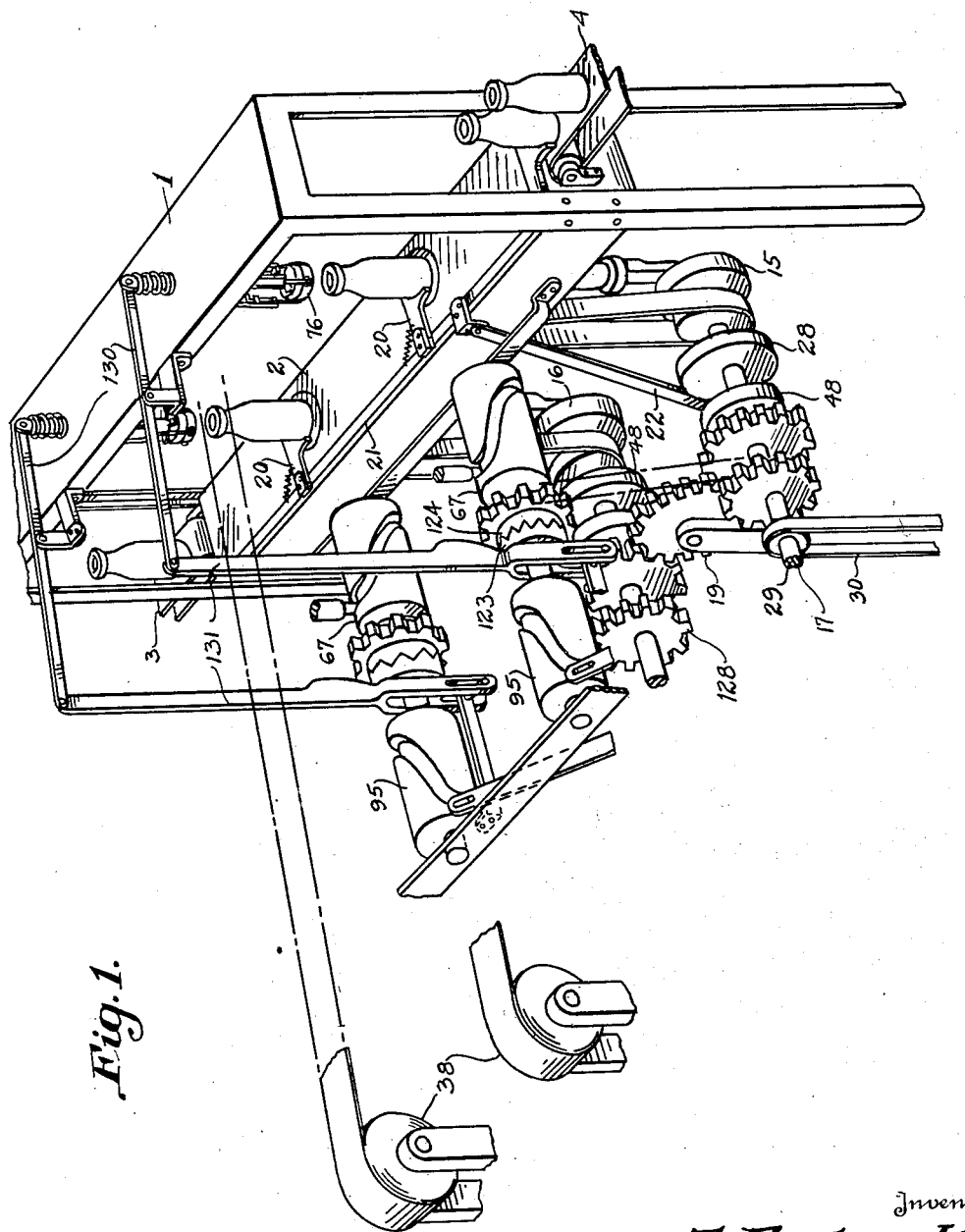

Referring now in detail to the several figures, and first adverting to Figures 1, 2 and 3, the numeral 1 represents a frame supporting a table 2 for the reception of milk bottles which are supplied to it successively by a conveyor 3 and from which the bottles are discharged by way of a conveyor 4. There are definite stations on said table at which points the bottles are operated upon and at each of these stations which are two in number in the present illustrative embodiment, the table 2 is formed with apertures 5 and 6 in which slide vertically reciprocable bottle holders 7 and 8. Figure 29 shows that the bottle holders are reciprocated by means of rods 9 and 10 having pins or rollers 11 and 12 acting in cam grooves 13 and 14 carried on cams 15 and 16. The cams are on shafts 17 and 18 rotated synchronously by common driving means represented by the sprocket 19. It is to be noted that the cam grooves 13 and 14 are in the same phase so that the bottle holders rise and fall together.

As the bottles approach the left hand end of table 2 upon the conveyor 3 as shown in Figure 1, they are engaged by translating means 20 which slide them along the table to definite positions upon the bottle holders 7 and 8. The translating means which may be in any desired number, are operated by a sliding bar 21 slidably actuated by a pitman 22, best shown in Figure 3. The pitman is pivoted at one end to a fixed support 23 and by a system of linkage including the bell crank 24 and link 25 it oscillates through an arc indicated between the full and broken line positions shown in Figure 4, the oscillatory movement being imparted by a cam groove 26 in which a roller 27 at one end of the bell crank 24 travels. The cam groove 26 is formed on the face of the cam 28, shown in connection with the power shaft 29 in Figure 1, which is continuously driven by any suitable prime mover represented by the belt 30.

In the present embodiment of the invention, two sealing units are shown in connection with a single conveyor, although the number could of course, be multiplied to any desired extent.

Figure 2 shows that the translating means 20 which are spaced apart a distance equal to the distance apart of the axes of the bottle holders 7 and 8, are pivotally mounted upon the bar 21 and each formed with a shoulder 31 arranged to coact with the side of said slide bar so as to inhibit yielding of said translating means in one direction. They are free however, to yield in the opposite direction, yielding against the tension of a light spring 32.

In operation, the bar 21 has an amplitude of reciprocation sufficient to permit the free ends of the translating means 20 to yield as they pass the two bottles on the bottle holders when the bar moves to the leftward as viewed in Figure 1 and to push the two bottles from the table on to the discharge conveyor 4 upon the return stroke of said bar. In the meantime, the other two translating devices have moved past two bottles on the supplying conveyor 3 and will push them to their proper centered positions upon the bottle holders as shown in Figure 1. Since bottles of different capacity vary in diameter, it becomes necessary slightly to adjust the stroke of the bar 21 in order that the bottles shall be accurately centered at their respective stations. This adjustment may be made as shown in Figure 24 by providing a lug on the sliding bar 21 having a plurality of perforations displaced laterally. These afford selective centers for pivotally connecting the pitman 22.

Proceeding now to the means for conforming the sealing hood to the mouth and pouring lip of the bottle, Figure 3 shows a bottle on the table 2 centered upon the bottle holder 8 which is shown in broken lines. Above the bottle holder is a forming head 33 which is shown in better detail in Figure 9. This forming head is carried by a plunger 34 which reciprocates through a suitable slide bearing 35 in a part 36 of the frame of the machine. The line $x$—$x$ in Figure 9 represents the plane in which the transparent sheet which is to become the sealing hood is presented to the bottle and the forming head. In its initial position, the bottle is below this plane and the forming head above it. When the sheet of transparent material cut to appropriate size and shape in a manner as will presently appear, is in position between the bottle and the forming head, resting upon the wire rack 37, the rod 10 through the action of the cam groove 14 elevates the bottle holder 8 pushing the bottle mouth up against the piece of transparent sheet carrying it upwardly off of the wire rack 37 and forcing it into the forming head 33 in the manner clearly shown in Figure 9.

The transparent sheet of material used in forming the sealing hood is fed from a roll 38 across a supporting frame 39, Figures 5 and 9, which carries at its outer end the wire rack 37. The supporting frame 39 is provided with spaced uprights 40 acting as a guide for the upper die carriage 41. The strip of Cellophane or other transparent material passes between the uprights and beneath the upper die carriage.

Two distinct sets of dies are carried by the die carriage, one comprising a pair of V-shaped knives 42 spaced at their apices and cooperating in shearing relation with corresponding V-shaped knives 43 secured to the frame 39. At the outer end of the upper die carriage is a knife 44 coacting with a knife 45 carried at the end of the frame 39. The function of the knives 44 and 45 is to sever the strip left after the V-shaped dies have acted thus separating from the strip of material a blank having the shape and size as indicated at 46 in Figure 5. The die carriage 41 is operated through a pitman 47 having a roller 48 at its lower end engaging a cam groove 49 on the face of the cam 50. Feeding means for bringing the blanks 46 into position at the sealing station are provided in the form of a pair of supports 51 arranged one on each side of the path of travel of the blanks upon which are oscillatably mounted a pair of levers 52 each having a long arm 53 and a short arm 54 furnished with a roller 55, said rollers being adapted to engage cams 56 on the upper die carriage, said cams being formed of halves 56' and 56" normally pressed together by springs 68, but opening to permit the passage of the roller when the upper die carriage descends, so as to avoid opening the grippers 58, but acting to displace said rollers and the levers 51 when the die carriage ascends. A pair of guide rods 57 are also provided one on each side of the path of travel of the Cellophane strip and to which the long arms 53 of the levers 52 are parallel. A pair of grippers 58 are slidably mounted on the rods 57, said grippers comprising a fixed jaw 59 and a movable jaw 60 adapted to be rocked into clamping engagement with the fixed jaw. A spring 61 holds the jaws normally together and they are moved apart for releasing purposes by the engagement of the long arm 53 of the levers 52 with a roller 62 carried by said rocking jaw. The grippers are united by a yoke 63 so that they will move together and said yoke is reciprocated through a range of movement limited by the length of the rods 57 by means of a telescopic rod 64, the lower end of which has a roller 65 travelling in the groove 66 of a cam drum 67.

In operation, while the die carriage is in the elevated position shown in Figure 9, the grippers are in position shown in Figure 5, with the end of the Cellophane strip gripped between them. As the die carriage descends the push rod 64 pushes the yoke 63 toward the bottle to be sealed, the grippers travel the rod 57 and carry with them the unsevered end of transparent material. The yoke 63 has completed its movement toward the bottle just before the descending die severs the Cellophane. The gripping fingers hold the Cellophane in the plane over the ascending bottle and as the bottle ascends toward the forming head, the cutting die ascends at the same time causing the roller 55 on the arm 52 to ride over the cams 56 and release the gripping fingers. The cutting head continues to ascend, the yoke 63 is moved backward by the arm 64 while the gripping jaws are still open. When the yoke 63 has completed its backward movement, the cutting head has advanced upward sufficiently to release the roller 55 and causes the gripping fingers to grip the Cellophane at the position shown in Figure 5.

Mechanism will now be described for conforming the transparent blank to the mouth and pouring lip of the bottle after it has been pushed into the forming head as shown in Figure 9, and for applying an encircling band or tape for securing the sealing hood in place. The part of the frame 36 shown in Figure 9 is provided adjacent the plunger 34 with depending guide members 69 carrying slidable rods 70. Said rods have angular portions 71 at their upper ends extending radially inwardly over a flange 72 carried by the plunger 34. When the plunger rises to a certain extent it engages the angular ends 71 lifting the rods 70 against the tension of springs 73. As the plunger descends and the flanges 72 breaks company with the angular ends 71, the rods 70 descend under the urge of the springs 73 until stops 74 on said rods engage the eye lugs 75 at the lower ends of said rods. Depending from the lower ends of said rods are a pair of specialized bands 76 and 77, the band 77 hangs from the rods by means of pivoted leaf springs 78 while the band 76 hangs from the band 77 by means of similar leaf springs. The band 76 is also secured to the lower ends of the rods 70. Both the bands 76 and 77 are sufficiently large to let the forming head pass therethrough so as to bring said bands against the free portion of the Cellophane blank below said forming head.

The band 76 as shown in Figure 12 is nonexpansible its purpose being merely to gather and depress the flaring edge of the Cellophane blank so that it will lie substantially parallel to the neck of the bottle. The band 77 however, is of the contractile type and as shown in Figure 26 is composed of two parts 79 and 80, one of which is slidable within the other.

When the parts are in the position shown in Figure 9, with the rods 70 in their lowermost position, the springs 78 are unstressed. The band 77 is therefore, at its maximum diameter. As the bottle rises against the forming head, forcing the plunger upward, the band 76 brushes against the flaring portion of the hood blank diverting it into a substantially cylindrical condition. As the plunger 34 moves still further upward, the angular portions 71 engage the flange 72 pulling up the rods 70 drawing the band 76 toward the lower ends of the rods 69. This stresses the springs 78 and causes them to assume positions such as are shown in Figure 10, in which they exert a decided end thrust against the divided band 78 pushing it into contact with the blank just below the pouring lip, and conforming the blank to the bottle beneath said pouring lip.

It will be recalled that the bottle is elevated for the performance of these various functions by the mechanism shown in Figure 29, and it will be observed from Figures 3 and 29 that the rods 9 are divided, the lower portions being non-rotatable and engaging the cam grooves 13 and 14, respectively, while the upper parts are provided with bevel gears 81 fixed thereto as shown in Figure 30 which at a certain point in the elevation of said rods coact with constantly driven bevelled gears 82 by means of which rotary movement is imparted to the upper parts of said rods, bottle holders 8, and the bottles themselves, so that the Cellophane blank which has now been conformed to the bottle rotates with said bottle through friction, within the band 77.

The band 77 is provided on one side with an aperture 83, which gives access to a device for feeding moist adhesive tape to the sealing hood which through the rotation of the sealing hood with the bottle becomes wrapped securely about said sealing hood. The taping mechanism will now be described.

Referring once again to Figure 2, a roll of adhesive tape 84 is shown, which tape is drawn edgewise along a guide frame 85. When it reaches the point designated as 86 in Figure 13, it is clamped by a gripper 87 which gripper is mounted on a carriage 88 slidable with a slide bar 89, see particularly Figure 15. Said slide bar is reciprocated in the guide frame by means of an oscillating link 90 fulcrumed at 91 and actuated by a link 92 associated with a block 93 which travels in the groove 94 of a cam drum 95. The carriage 88 which carries the gripper 87 has roller 96 travelling over a track 97 provided with a cam 98 at a point where it may be desired to engage the gripper with the end of the tape. The carriage is normally held with the carriage in engaging relation to the tape by means of a spring 99.

Referring to Figure 13, the tape being gripped as shown by the gripper 87, and sliding motion being imparted to the slide bar, the carriage travels to the right carrying with it the tape. The range of travel brings the carriage to a cam elevation 100 upon which the roller 96 rises and releases the adhesive tape. The cam elevation 100 is positioned at such a point on the track 97 as to cause the release of the gripper prior to the engagement of the pin of the roller 117 by the lug 117', in other words, prior to the beginning of the movement of the roller 117 in the slot 116 of the pivoted bracket. This lays the adhesive strip out on the top of the slide bar and through the channel 107, and releases it before it is deflected toward the bottle by the angular movement of the bracket 115. Since the slide bar 89 must run out until the roller 117 reaches the closed end of the guide bar, the track is made sufficiently long beyond the shoulder of the cam elevation 100 to allow for the corresponding movement of the carriage and roller 96.

In travelling from the left to the right end of the guide frame, the roller 96 of the gripper carriage did not rise over the cam elevation 98 in view of the construction of the cam elevation shown in Figure 17 in which the cam is constituted by two elements 101 and 102 pivotally mounted as at 103 and 104, but normally kept together by springs 105 and having inclined surfaces 106 engageable by the roller 96 so as to separate the parts of said cam and permit the roller to ride through without being elevated. On its return trip the carriage rides upon the cam 98, the gripper being thus elevated and made ready for the gripping of the remaining end of the tape.

It will be noted from Figure 13 and from the cross sectional views shown in Figures 18 and 22 that from the time the carriage begins to move from the left hand end of the guide frame, the adhesive tape is carried into a channel 107 carried by an oscillating arm 108 and that when the carriage stops adjacent the opposite end of the guide frame the adhesive tape has been carried through the oscillating arm. The slide bar 89 carries a pin 109 adapted to engage in the angle of an intersecting pair of bell crank levers 110 and 111, each carrying the cooperating knife 112 and 113 of a shearing device and when the guide rod reaches the position in which the gripper 87 is at the right hand limit of its range of travel, said pin actuates said bell crank levers to bring said knives together upon opposite sides of the adhesive tape, severing it so as to include within the trough the oscillating arm 108, a length of said adhesive tape sufficiently to encircle the neck of the bottle and to overlap somewhat.

The oscillating arm 108 is pivoted to the guide frame 85 as at 114 and provided with a bracket 115 cut away to form a slot 116 angularly disposed with respect to the direction of travel of the slide bar. A pin with anti-friction roller 117 bearing in the slot 116 of the bracket slides in a slot 116' in the slide bar 89, see Figure 16. Since the range of movement of the slide bar extends at least from the left hand position of the carriage shown in Figure 13, to the right hand position shown in Figure 14, while the roller 117 is required to move only a distance in the slot 116' equal to the length of the slot 116 of the bracket, lost motion is provided, the slot 116' being much longer than the length of the slot 116, and the slide bar 89 being provided with lugs 117' and 118' suitably spaced from each other and from the ends of the slot 116' and respectively engageable with the pin in opposite directions of movement of the slide bar 89. When the slide bar travels to the right, the roller 117 coacting with the walls of the slot 116 oscillates the arm 108 outwardly bringing the outer end thereof together with the length of tape therein enclosed into contact with the sealing hood through the aperture 83 in the band 77. The range of movement of the carriage 88 is such that a small portion of the adhesive tape projects beyond the free end of the channel 107 of the oscillating arm 108, which portion is pressed into contact with the constricted part of the sealing hood by a light spring 118 fixed to the end of the oscillating arm. As the bottle is rotating when the tape is thus applied, the length of tape is drawn out from the oscillating arm and wrapped around the sealing hood being adhesively secured thereto, the ends of the tape overlapping. A moistener 119 may be situated at any desirable point along the oscillating arm and connected by a suitable flexible tubing 120 to a source of water supply. The nozzle of the moistener may contain a brush 121, kept damp by moisture from the water supply, and being arranged in wiping engagement to the length of adhesive tape.

Figure 3 shows that the cam drums 67 and 95 are not constantly driven as are the bottle feeding and the Cellophane cutting means, but that they are intermittently driven through a clutch 122 comprising the coacting clutch faces 123 and 124 which are normally kept apart by a spring 125. The main power drive exemplified by the motor 126 drives the clutch face 124 through a chain and sprocket connection 127, the clutch face 124 being freely revoluble on the shaft 128 on which the drums 67 and 95 are mounted. When the bottle in its rising movement pushes up the plunger 34 against the tension of the spring 129, a rocker arm 130 is operated which pushes down upon a link 131 forcing a swell 132 against the clutch face 123 which is keyed to the shaft 128 into contact with the power driven clutch face 124 connecting the shaft to said clutch and operating the cam drums 67 and 95.

Of course, when the person feeding bottles to the conveyor 3 fails to supply the bottles as fast as they can be cared for by the apparatus so that no bottle appears at a sealing station, the Cellophane and tape feeding mechanism will be inhibited and waste of material will be avoided. Since there is no Cellophane beneath the die at this time, there is no disadvantage in having the die operate continuously.

For the purpose of adapting the machine to care for bottles of various heights provision is made for elevating both the supporting frame and the upper die carriage, thus determining the level at which the transparent sheet for the sealing hood and the tape for securing the same shall be presented between the mouth of the bottle and the forming head. The means for raising the supporting frame is shown in Figure 33 comprising a mere toothed segment 133 with which the detent of a lever 134 adjustably engages. Said lever is fulcrumed at an intermediate point 135 and its far end is pivotally secured to a push rod 136 for elevating the supporting frame 39 relative to the uprights 40 on which it is slidably mounted.

The upper die carriage is adjustably raised by varying the length of the pitman 47 which as will be seen from Figure 3 is sectional in construction having bosses 137 on one section fitting into corresponding recesses 138 on the other section, the parts being held together by a bolt and thumb nut 139 extending through a slot in one of said sections, and the telescopic rod 64 varying in length to keep roller 65 in groove 66.

The operation of the invention having been described in connection with the several correlated features, a repetitive description of the entire operation at this point is deemed to be unnecessary.

While I have endeavored to disclose a practical embodiment of the invention, it is to be understood that the details of construction as shown are merely by way of example and not to be construed as limiting the scope of the invention which is defined in the appended claims.

What I claim is:

1. Machine for automatically applying a sealing hood to bottles comprising a forming head, means for presenting a bottle beneath said forming head, means for locating a flat sheet between said bottle and said forming head, means for pushing said bottle and sheet into said forming head for forming the sheet into a hood, means for securing said hood in place, means for driving said bottle presenting means, sheet locating means and securing means, a normally open clutch between said driving means and said sheet locating and securing means, and means actuated through said forming head for closing said clutch upon upward movement of said forming head occasioned by the presence of a bottle between said forming head and said pushing means.

2. In a machine for automatically applying a sealing hood to bottles, means for locating a blank of sheet material above the mouth of said bottle for the formation of said hood, said means comprising feeding mechanism for bringing the end portion of a continuous strip of sheet material into position, and means for severing the end portion of said strip to form a blank, said means simultaneously partially severing an adjacent portion of said strip.

3. In a machine for automatically applying a sealing hood to bottles, as claimed in claim 2, means for conforming said blank about the mouth and pouring lip of said bottle to form a hood, and means for encircling said conformed hood with a securing band comprising means for cutting off an appropriate length of band from a continuous strip, means including an oscillating arm for bringing one end of said cut off length into contact with said hood, and means for rotating said bottle for winding said length upon said hood.

4. In a machine for automatically applying a sealing hood to bottles, a forming head, dies adjacent said forming head, means for presenting a bottle beneath said forming head, means for locating a flat sheet blank between said bottle and forming head comprising grippers for seizing the end of a continuous strip of the sheet material from which the blank is to be cut, and drawing the same into position between said dies, means for actuating the dies to cut off said blank, means actuated by the movement of one of said dies for causing said grippers to grip said blank and move it into position between said bottle and forming head.

5. Machine for automatically applying a sealing hood to bottles comprising a forming head, means for presenting a bottle beneath said forming head, means for locating a flat sheet between said bottle and said forming head, means for pushing said bottle and sheet into said forming head, forming the sheet into a hood, means for constricting said hood against said bottle beneath said pouring lip comprising a contractile band, a band of fixed diameter in advance of said contractile band, guides, rods slidable in said guides secured to said band of fixed diameter and having their upper ends in the path of movement of said forming head to be elevated thereby, springs connecting said contractile band to said guides and to said band of fixed diameter, said springs executing a toggle action inwardly with respect to said contractile band when said rods are moved upward by said plunger for contracting said band.

6. Machine for automatically applying a sealing hood to bottles as claimed in claim 5, in which said contractile band is formed with a lateral aperture, said machine including means for presenting the end of an adhesive tape to said hood through said aperture.

7. Machine for automatically applying a sealing hood to bottles as claimed in claim 5, in which said contractile band is formed with a lateral aperture, said machine including an oscillating arm for presenting the end of an adhesive tape to said hood through said aperture, and means for rotating said bottle to encircle said hood with said tape.

8. Machine for automatically applying a sealing hood to bottles comprising a forming head, means for presenting a bottle beneath said forming head, means for locating a flat sheet between said bottle and said forming head, means for pushing said bottle and sheet into said forming head for forming the sheet into a hood, means for constricting said hood against said bottle beneath said pouring lip comprising a contractile band, means actuated by said forming head as it moves upward for contracting said band about said bottle, and a band of fixed diameter in advance of said contractile band for drawing the edges of said blank into close relation to said bottle.

9. Machine for automatically applying a sealing hood to bottles comprising a forming head, means for presenting a bottle beneath said forming head, means for locating a flat sheet between said bottle and said forming head comprising means for intermittently feeding the end portion of a continuous strip of sheet material to the desired point, and means for severing a blank from the end of said strip, in situ, means for pushing said bottle and said blank into said forming head, means for constricting said blank against the neck of said bottle for forming said blank into a hood, means for securing said hood in place comprising means for feeding the end portion of a continuous strip of tape to a point adjacent said hood, means for severing an appropriate length of tape from said end portion, means for applying said length to said hood and means for rotating said bottle whereby said tape is made to encompass said hood, means for driving said bottle presenting means, said sheet locating means and said securing means, a normally open clutch between said driving means and said sheet locating and securing means, and means actuated through said forming head for closing said clutch upon upward movement of said forming head occasioned by the presence of a bottle between said forming head and pushing means.

JOHN T. EUBANK.